United States Patent [19]

Schlenoff

[11] Patent Number: 5,466,930
[45] Date of Patent: Nov. 14, 1995

[54] SOLID SCINTILLATORS FOR DETECTING RADIOACTIVE IONS IN SOLUTION

[75] Inventor: Joseph B. Schlenoff, Tallahassee, Fla.

[73] Assignee: Florida State University, Tallahassee, Fla.

[21] Appl. No.: 200,213

[22] Filed: Feb. 23, 1994

[51] Int. Cl.[6] .................................................. G01T 1/20
[52] U.S. Cl. ............................. 250/252.1; 250/361 R; 250/483.1
[58] Field of Search ........................... 250/252.1, 361 R, 250/362, 483.1

[56] References Cited

U.S. PATENT DOCUMENTS

| | | | |
|---|---|---|---|
| 2,597,439 | 5/1952 | Bodamer | 260/85.1 |
| 2,597,440 | 5/1952 | Bodamer | 260/85.1 |
| 2,681,317 | 6/1954 | Grossman | 252/301.2 |
| 3,150,101 | 9/1964 | Heimbuch | 252/301.2 |
| 4,127,499 | 11/1978 | Chen et al., | 250/483.1 |
| 5,308,986 | 5/1994 | Walker | 250/370.11 |
| 5,313,064 | 5/1994 | Fujii | 250/361 R |

OTHER PUBLICATIONS

G. Inzelt et al. "Combined Electrochemical and Radiotracer Study of Anion Sorption from Aqueous Solutions Into Polypyrrole Films", J. Electroanal. Chem., 230 (1987) 257–265.

F. Heltterich, "Ion Exchange" McGraw Hill, N.Y. (1962) pp. 34–71.

*Primary Examiner*—Constantine Hannaher
*Assistant Examiner*—Richard Hanig
*Attorney, Agent, or Firm*—Senniger, Powers, Leavitt & Roedel

[57] ABSTRACT

A scintillator for absorbing and concentrating radioactive ions within a solution, the scintillator including a solid scintillator and an ionic layer on a surface of and in contact with the solid scintillator. When radioactive ions are absorbed by the ionic layer, the scintillator acts as a light source.

27 Claims, 1 Drawing Sheet

SOLID SCINTILLATORS FOR DETECTING RADIOACTIVE IONS IN SOLUTION

This invention was make with Government support under Grant #DMR9107014 awarded by the National Science Foundation. The Government has certain rights in the Invention.

BACKGROUND OF THE INVENTION

The present invention relates generally to scintillators for absorbing and concentrating radioactive ions within a solution, and light sources formed from the scintillators. The invention particularly relates to modified solid scintillators having an ionic surface layer which absorbs radioactive ions.

Contaminated surface and ground water and effluents from power generating stations and industrial sites often contain radioactive particles. These solutions are continuously or intermittently monitored to determine the level of radioactive particles in solution. A substantial amount of the radiation in these solutions is present as positive ions, such as uranium, cesium and actinides, and negative ions, such as iodate and $TcO_4^-$. These ions produce gamma-rays, x-rays and other electromagnetic radiation which is detected using conventional external detectors including Geiger counters and gas proportional detectors. Electromagnetic radiation can be detected by external sources because it has a relatively long penetration length through a surrounding medium. $\alpha$ and $\beta$ particles, however, have a short penetration length through the surrounding medium, preventing these particles from being detected by an external detector.

Radiation emitted by radioactive ions within a solution has been counted using liquid scintillation techniques. A sample of solution is prepared for liquid scintillation analysis by mixing the sample with an aqueous compatible liquid scintillation cocktail or by extracting the radioisotopes from the sample and adding an organic solvent. During liquid scintillation counting, electromagnetic or particulate radiation emitted by radioactive ions impinges on or passes near fluorescent dye molecules (fluors) capable of emitting light in response to the radiation. Energy emitted by the radiation excites the fluor and the fluor emits light. This light emission is known as scintillation. These optical events are detected by a sensitive detection device, such as a photomultiplier tube, or a charge coupled device and are converted into corresponding electrical pulses.

The radioactive content of samples containing an appreciable amount of suspended organic or particulate matter cannot be reliably determined via liquid scintillation counting. The suspended matter within the sample prevents the light emitted from a fluor from being optically detected. Although a sample can be filtered to remove the suspended matter, radioactive ions that are bound to the suspended matter are also removed during filtration, reducing the radioactivity count for the sample.

Radiation has also been detected by adding a solid scintillator to a sample solution. The solid scintillator is composed of a fluor that is typically dispersed in a plastic medium, such as polystyrene as described by Bross et al., Nucl. Instr. and Meth. A307, pp. 35–46 (1991), D'Ambrosio et al., Nucl. Instr. and Meth. A307, pp. 430–435 (1991), Majewski et al., Nucl. Instr. and Meth. A281, pp. 500–507 (1989), Zorn et al., Nucl. Instr. and Meth. A273, pp. 108–116 (1988), and Zorn et al., Nucl. Instr. and Meth. A271, pp. 701–703 (1988). Radiation emitted by radioactive ions within the solution that are in close proximity to the solid scintillator will excite the fluor and produce detectable optical events. Radioactive ions dispersed throughout the remainder of the solution will emit $\alpha$ and $\beta$ particles that are too far removed from the scintillator to penetrate the scintillator and excite the fluor.

A scintillator including an ionic layer separated from a solid scintillator by supporting layers has been described. Inzelt et al., *J. Electroanal. Chem.* 230, pp. 257–265 (1987) disclose an ionic polymeric layer and an associated support structure on a glass scintillator. Their method involves evaporating a metal film onto a polymer film to form a support structure. The ionic polymeric layer is then applied on top of the metal film. The polymer film that supports the metal film and the ionic polymeric layer is placed on a glass scintillator plate. The ionic polymeric layer absorbs radioactive ions from solution. A disadvantage associated with thins scintillator is that radioactive decay particles must penetrate the metal and polymer support layers in order to penetrate the scintillator. Weakly penetrating particles that cannot penetrate the support layers will not be detected.

There is a need for a scintillator that can absorb radioactive ions within a solution and enable direct detection of particulate and electromagnetic radiation regardless of the turbidity of the sample solution. A light source for providing light over a uniform area is also needed.

SUMMARY OF THE INVENTION

It is a primary object of the present invention to provide a scintillator which absorbs radioactive ions within a solution. In this connection, a related object of this invention is to provide a scintillator which facilitates direct detection of a and B particles and electromagnetic radiation without the need for filtering or otherwise processing the solution prior to analysis.

It is another object of this invention to provide a scintillator capable of extracting a portion of the radioactive ions that are bound to suspended matter within the solution.

Yet another object of this invention is to provide a scintillator capable of uniformly producing light for use as a light source.

Other objects and advantages of the invention will be apparent from the following detailed description.

In accordance with the present invention the foregoing objectives are realized by providing a scintillator for absorbing and concentrating radioactive ions within a solution. The scintillator includes a solid scintillator and an ionic layer on a surface of and in contact with the scintillator. The ionic layer is preferably an ion exchanging material, such as an ion exchange resin or zeolite, or a layer of charged groups, such as sulfonate anions, carboxylate anions, or secondary amine, tertiary amine, or quaternary ammonium cations. The solid scintillator includes an optically clear solid. The optically clear solid is preferably a plastic including polystyrene. The solid scintillator can include a compound containing an element having an atomic number of at least 35, preferably of 50 to 83.

The present invention is also directed to a light source for calibration of imaging devices. The light source is composed of the scintillator having radioactive ions bound to the anions or the cations of the ionic layer.

Another embodiment of the invention is a method of using a scintillator for absorbing and concentrating particulate radiation within a solution by binding radioactive ions within the solution to ionic groups on a surface of and in contact with a solid scintillator to extract the ions from the solution.

DETAILED DESCRIPTION OF THE PREFERRED EMBODIMENTS

Figure 1:
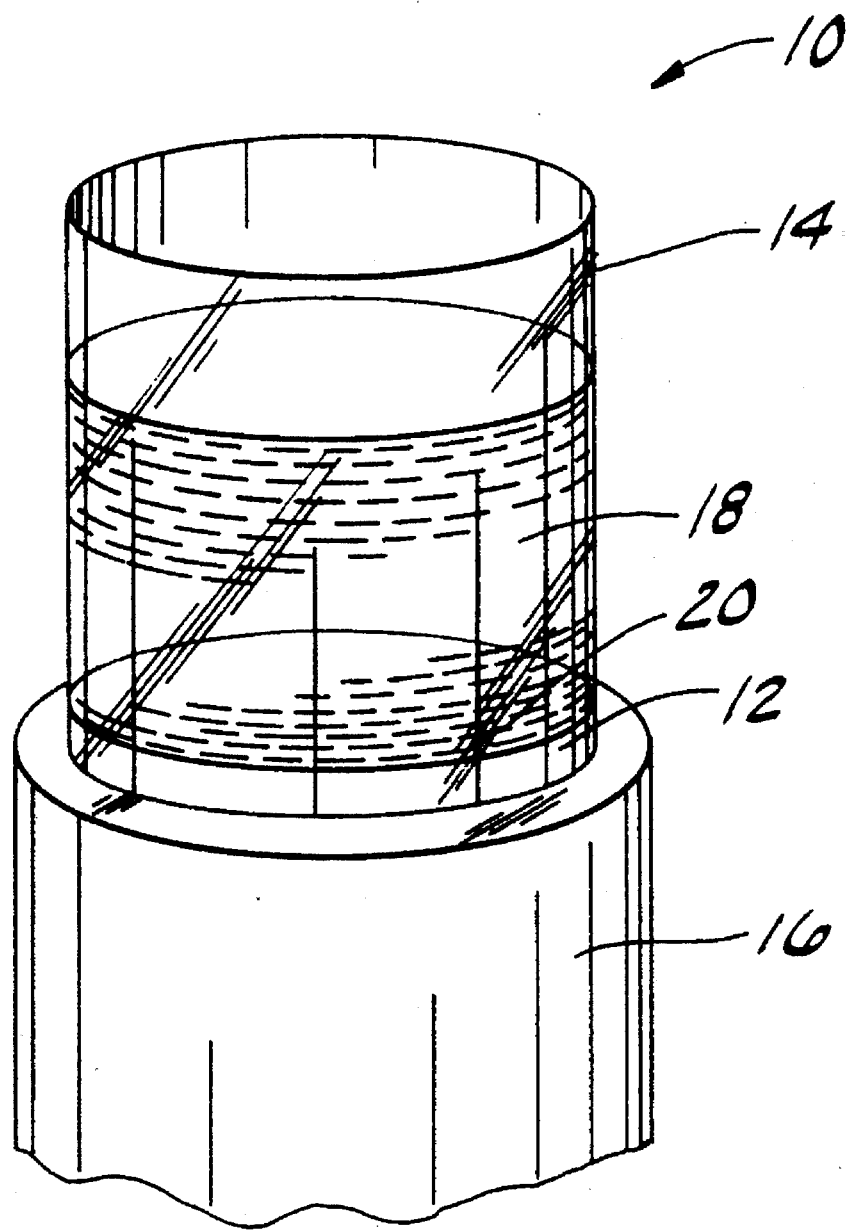
FIG. 1 is a cross-sectional view of a radiation detection system of the present invention.

In accordance with the present invention it has been discovered that a solid scintillator can be modified to form an ionic layer on a surface thereof which is capable of absorbing radioactive ions within a solution. The scintillator can be used to detect radioactive decay particles, such as α and β particles and electromagnetic radiation emitted by the radioactive ions, regardless of the presence of suspended organic and particulate matter in the solution. The scintillator, when including adsorbed radioactive ions, can be used as a source of continuous, uniform light.

The present invention is directed to a scintillator comprising a solid scintillator and an ionic layer in contact with and formed on at least one surface of the solid scintillator. The solid scintillator includes an optically clear solid.

When an ion exchanging material is deposited on the solid scintillator to form the ionic layer as will be later described, any optically clear solid can be used. Many of the commercially available solid scintillators employ plastics such as polystyrene as the optically clear solid which supports the fluor.

When the solid scintillator of the present invention is chemically modified to form the ionic layer as described below, the optically clear solid is a plastic compound. The plastic compound is preferably an optically clear polymer which is unsubstituted at the 4- (para-) position of the benzene ring because the chemical modification occurs primarily at the para position. Plastics which are substituted at the para position, such as vinyl toluene (4-methyl styrene) are not susceptible to such modification. If these plastics are to be used in the present invention, they are copolymerized with a monomer having a portion that can be chemically modified. A plastic having some para position substitution is a vinyl toluene-polystyrene copolymer.

The plastic compound includes a relatively low percentage of crosslinking agent of from about 1 to about 10 mol %, preferably from about 2 to about 8 mol %. The charged crosslinked plastic will produce a gel when immersed in aqueous solution, permitting faster diffusion of radioactive ions through the scintillator. Crosslinking can be induced in polystyrene by adding as much as 25 mol % pure divinylbenzene or other crosslinking agent during polymerization as described by Helfferich, F., *Ion Exchange*, McGraw Hill, New York, 1962, pp. 35–36, or by post-treating the plastic with radiation or chemical crosslinking agents. Suitable crosslinking agents are well known in the art and include divinylacetylene and butadiene.

Plastics having less than about 1% crosslinking or no crosslinking are unsuitable for purposes of the present invention. The charged groups forming the ionic layer on the surface of the solid scintillator impart water solubility to the plastic. These groups cause the plastic to dissolve in aqueous solution if the plastic is not sufficiently crosslinked.

Any fluors used in scintillation counting techniques can be used in forming solid plastic scintillator. Examples of suitable fluors include paraterphenyl, quaterphenyl, oligophenylenes, di-t-amyl-p-terphenyl, phenyloxazol derivatives, isoquinoline derivatives, 10-hydroxybenzo[h]-quinoline, 1-phenyl-3-mesityl-2-pyrazoline, 1-p-tolyl-3-mesityl-2-pyrazoline, 1-p-tolyl-3-(2',6'-dimethoxyphenyl)-2-pyrazoline, 1-p-anisyl-3-mesityl-2-pyrazoline, 1-p-anisyl-3(2',6'-dimethoxyphenyl)-2-pyrazoline, benzoxanthene derivatives, 2,2'-bipyridine-3,3'-diol, and 2-(2'-hydroxyphenyl)benzothiazole. 3-hydroxyflavone or other fluors that have a large Stokes shift (i.e., a large separation between absorption and emission maxima) can also be used in forming the solid scintillator to minimize radiationless energy loss from the reabsorption of emitted photons by a fluor. The fluors are typically present in low concentrations of about 1 wt. % of a primary fluor and about 0.1 wt.% of a secondary fluor. The primary fluor transfers energy to the secondary fluor which shifts the light to a longer wavelength in the visible spectrum.

The fluor is incorporated within the optically clear solid to form the solid scintillator by conventional methods. The fluor can be dispersed within the optically clear solid by physically dissolving it within the solid. The fluor can also be chemically bonded to the polymer molecule if a plastic is used.

Solid scintillators for use in the present invention are commercially available from various manufacturers. One, such solid scintillator is SCSN81, a blue-fluorescing 2% divinylbenzene crosslinked polystyrene based plastic scintillator manufactured by Kuraray, Co., Ltd. Methods for manufacturing these solid scintillators are well known in the art.

If electromagnetic radiation is to be detected using the scintillator, the solid scintillator must include a compound containing an element having a high atomic number, such as lead, bismuth, or tin. Any element having an atomic number of 35 or above can be used. Elements having an atomic number of 50 to 83 are preferred. These compounds enable the solid scintillator to absorb the electromagnetic radiation. Methods for loading solid scintillators with lead compounds or other compounds ! including high atomic number elements are known in the art. The compound can be added to the molten polymer for dispersion, chemically bonded to the polymer, or dissolved in the monomer before it is polymerized by heat treatment.

The ionic layer formed on a surface of the solid scintillator is a thin charged layer of uniform thickness. The layer is composed of any cationic or anionic group that binds oppositely charged radioactive ions that are present in a solution. Representative anionic groups include sulfonate and carboxylate groups and suitable cationic groups are secondary and tertiary amines and quaternary ammonium. The ions can absorb uranium, cesium, iodate and other radioactive ions typically found in contaminated solutions.

In conventional solid scintillating techniques, weakly penetrating radioactive decay particles, such as α and β particles produced by ions, are not detected accurately because the energy emitted by the particles is absorbed before it contacts the solid scintillator. In the present invention, the radioactive ions bound to the surface ionic groups are in close proximity to the adjacent solid scintillator, enabling penetration of weakly penetrating particles into the solid scintillator.

A uniform ionic layer formed on the surface of and in contact with the solid scintillator results in a uniform distribution of adsorbed radioactive ions. These ions emit radiation which excites the fluors, producing a uniform emission of light from the scintillator. This scintillator including adsorbed radioactive ions constitutes the light source of the present invention.

The surface of the solid scintillator must be modified to produce the layer of chemically bonded charged functional groups on the surface. Surface modification is provided by chemical reaction for plastic compounds or by deposition. Chemical reaction can be performed when the plastic scintillator includes benzene rings which are unsubstituted in the para- position. A thin ion exchange layer can be deposited on the solid scintillator when desired or when the plastic scintillator is para- position substituted.

Chemical modification is performed by exposing the solid scintillator to an appropriate reagent in the gas or liquid phase. Appropriate reagents for surface modification have been used in forming ion exchange resins as described by Helfferich, F., *Ion Exchange*, McGraw Hill, New York, 1962, pp. 34–71 which is incorporated herein by reference. The reagents used in modifying ion exchange resins can also be used to form the ionic layer of the present invention. For example, a negatively charged layer is formed on a polystyrene based scintillator by sulfonating its surface with fuming sulfuric acid. The fuming sulfuric acid is a solution of 0 to about 20 wt. % sulfur trioxide in sulfuric acid. The solid scintillator surface can be sulfonated by dispensing an aliquot of the fuming sulfuric acid on top of the surface to be sulfonated and allowing a reaction time at a selected temperature. Any surface that is not to be modified can be covered with tape or some other covering material. The sulfonated surface is then rinsed in an organic solvent and water rinsed. The surface is first rinsed in an organic solvent because the residual surface acid reacts exothermically on contact with water to generate spots on the surface of the scintillator. The resultant ionic layer has sulfonate ($SO^-$) groups uniformly distributed on the surface of the solid scintillator. The effective (dry) thickness of the sulfonated layer is determined by immersing the scintillator in a large excess of 2 Ci mol$^{-1}$ $^{45}$CACl$_2$, rinsing the surface, counting and then allowing a standard addition of $^{45}$Ca to dry on the surface. Other reagents used in forming ion exchange resins, such as phosphorus trichloride, can be used to modify a polystyrene based scintillator.

Another negatively charged layer of the present invention is formed by modifying a polymethyl methacrylate based scintillator. The ester groups of the polymethyl methacrylate are hydrolyzed when exposed to a base, yielding carboxylate groups which are ionized in alkaline solutions.

A negatively charged layer-can also be formed by condensing phosphorus trichloride with the benzene rings of the polystyrene in the presence of a Friedel-Crafts catalyst, such as aluminum trichloride, to form phosphinic acid groups as described in British Patent No. 726,918. Selenonic acid groups can be formed by treating the benzene rings of the polystyrene with selenic acid as disclosed in German Patent No. 942,624. The polystyrene can also be copolymerized with acrylic or methacrylic acid to form weakly negatively charged groups.

A positively charged layer can be formed on a polystyrene based scintillator by contacting the solid scintillator with chloromethyl methyl ether and an aluminum, zinc or stannous chloride catalyst to produce chloromethyl groups on the solid scintillator surface. The chloromethyl groups are further modified by exposure to amines to yield secondary amine, tertiary amine and quaternary ammonium groups. The amine groups are positively charged in acid solution, and quaternary ammonium groups are positively charged at any pH. This process is disclosed in U.S. Pat. Nos. 2,597,439 and 2,597,440 and by Helfferich, F., supra, pp. 52–58, all of which are incorporated herein by reference.

Positively charged phosphonium groups can be formed by chloromethylation followed by modification of the chloromethyl groups with alkylaminophosphine as described in U.S. Pat. No. 2,764,560. Additional methods for forming positively charged groups are well known in the ion exchange art.

The ionic layer of the invention can be formed by depositing an ion exchanging agent on the solid scintillator by various conventional methods. The solid scintillator can be dip coated in the ion exchanging agent or the agent can be dispensed on the solid scintillator surface and evaporated. These methods, however, may fail to provide a uniform coating. The preferred method of depositing the agent is by spin coating the solid scintillator with the agent. In a spin coating process, the agent is dispensed dropwise onto the solid scintillator as it is rotated at a constant speed. The agent spreads across the surface of the rotating solid scintillator and dries to form a uniform layer.

Any ion exchanging material that is insoluble in water or that can be made insoluble in water by crosslinking after deposition can be used as the ion exchanging agent. Representative ion exchanging materials include ion exchange resins and zeolites! . An ion exchanging resin can be subjected to electron bombardment, gamma radiation or ultraviolet radiation to crosslink the resin. An example of a suitable positively charged ion exchange resin is polyvinylbenzyltrimethyl ammonium chloride. NAFION™, a copolymer of tetrafluoroethylene and perfluoroether sulfonate available from E. I. du Pont de Nemours & Company, is a negatively charged ion exchanging resin which can be cast on the solid scintillator surface and crosslinked by heating or radiation to render it insoluble.

The thickness of the resultant ionic layer ranges from about 0.5 nm to about 30 µm and preferably ranges from about 10 µm to about 20 µm. Although a thicker ionic layer exhibits a slower response time, it absorbs more radioactive ions and has a better detection limit. The ionic layer must, however, be thin enough to allow α and β particles to penetrate the layer and impinge upon the solid scintillator. The depth of the surface modification is dependant upon the duration of the exposure, the concentration of the surface modifying reagent and the temperature. A thicker surface layer is formed with longer exposure times, higher concentrations, or higher temperatures.

The surface area of the solid scintillator which is to be modified to contain ionic groups is dependant upon the volume of oppositely charged radioactive ions in the solution. A greater surface area of the solid scintillator is modified for use in analyzing highly contaminated solutions. In many instances, only one surface of the solid scintillator is modified by covering the other surfaces with tape during the modification process.

When a polystyrene based scintillator is sulfonated as described above, the concentration of sulfur trioxide in the sulfuric acid significantly affects the thickness of the sulfonated layer as shown in Table 1. A thicker sulfonated layer was formed with increasing sulfur trioxide content whether exposure occurred for a period of minutes or several hours.

TABLE 1

| SO₃ Concentration in Sulfuric Acid | Layer Thickness (nm) |
| --- | --- |
| 0% | 0.2 |
| 2% | 1.5 |
| 5% | 14 |
| 10% | 420 |
| 20% | 11,000 |

The present invention is also directed to a method of using the scintillator for absorbing and concentrating particulate radiation within a solution. The radioactive ions within the solution are bound to the ionic groups to remove the ions from the solution and concentrate the ions adjacent the solid scintillator.

When the radioactive ions have been absorbed by the scintillator, the radioactive content of the solution is then detected by ex-situ or in-situ detection methods. FIG. 1 illustrates an exemplary in-situ detection system 10 which involves placing the scintillator 12 in a receptacle 14 wherein the unmodified surface of the scintillator 12 rests upon an optically clear window (not shown) positioned above a photomultiplier tube 16 or other detection device. The sample solution 18 is then added to the receptacle 14 such that it is in contact with a modified surface 20 of the scintillator. The charged groups of the ionic layer (not shown) attract the radioactive ions (not shown) within the solution and bind them. These ions emit electromagnetic or particulate radiation that penetrates the solid scintillator 12 and excites the fluors (not shown). Light emitted from the fluors is detected by the photomultiplier.

Other arrangements wherein the area between the modified surface of the scintillator and the detection device is not obscured by opaque material, and wherein the modified surface is in contact with the solution are also suitable. For example, the scintillator can form the bottom of the receptacle in the arrangement described above.

The radioactive content of a solution can also be determined by remote in-situ detection methods. In one method, a waveshifting fiber containing a fluor extends through the scintillator. When the radioactive ions in solution bind to the charged groups of the ionic layer and emit radioactive particles that excite the fluor, a portion of the emitted light is absorbed by the waveshifting fiber. The fiber then re-emits the light in a geometry that is suitable for efficient propagation down the fiber to a remote light detector. The light is shifted to a longer wavelength by this process.

Ex-situ detection involves exposing the scintillator to a sample suspected of containing radioactive ions as described above, followed by removal of the scintillator from the solution and detection of the light emitted from the scintillator.

The light sources of the present invention are made by first forming the scintillator and binding radioactive ions to the charged groups of the ionic layer. After the binding process, the light source is removed from the solution and dried. The surface of the light source that has adsorbed ions (the exposed surface) is then covered or sealed to contain the radiation within the light source.

If the light source is covered, any covering that is thick enough to absorb particulate and electromagnetic radiation is appropriate. Covering materials including coatings, epoxies, sealants and metal foil of at least 1 mm thickness will quench the radiation.

Alternatively, the light source can be sealed by sealing the exposed surface of a light source to the exposed surface of another light source. Styrene can be dropped onto one of the exposed surfaces. The styrene is then pressed between the two exposed surfaces, inducing it to polymerize by radiation and form a seal. The thickness of the scintillator surrounding the exposed surfaces absorbs the radiation so that it is entirely contained within the light source.

The period of time during which the light source will produce light depends upon the half-life of the radioisotope. $^{45}$Ca (as $CaCl_2$), $^{14}$C (as a carboxylate), or $^{90}$Sr (as $Sr(NO_3)_2$) are β- emitters that can provide light over a uniform area for a sufficient time period. The light sources of the present invention can be used to calibrate imaging devices including charge coupled devices such as video cameras and photomultiplier tubes used in spectroscopy and detection of light.

The following example is presented to describe preferred embodiments and utilities of the present invention and is not meant to limit the present invention unless otherwise stated in! the claims appended hereto.

EXAMPLE

Cubes of SCSN81 (crosslinked polystyrene based plastic scintillator from Kuraray, Co., Ltd.) of 1.3×1.3×1 cm dimension were cut from a sheet of one cm thickness with polished surfaces. The cubes were ultrasonicated in water for twenty minutes and rinsed to remove glue on the surface of the cubes which remained after removal of the packaging paper covering the sheet as supplied. The exposed surfaces of the solid scintillator were sulfonated by dispensing a small aliquot of fuming sulfuric acid on top of one of the polished surfaces. The reaction proceeded for 15 minutes at room temperature. The scintillator was then rinsed in methanol, followed by a water rinse. The surface of the solid scintillator was covered with a layer of $SO_3^-$ groups as a result of the treatment.

The thickness of the sulfonated layer ranged from 0.2 to 10,000 nm depending upon the sulfur trioxide concentration in the acid as shown in Table 1. Scanning electron micrographs of cross-sectioned samples indicated a uniform film thickness when 1 to 10 μm layers were produced on the surface with a sharp boundary between sulfonated and unsulfonated polymer.

The scintillator was used to adsorb cations. $^{45}$Ca as $CaCl_2$ (99% radioisotopic purity) was selected as the probe cation and is available from ICN Radiochemicals of Irvine, Calif. $^{45}$Ca is a β-emitter with $E_{max}$ of 0.257 MeV. Scintillation was detected using a RCA 8850 end-on photomultiplier tube biased to 2200V with a Bertran 313B high voltage supply. Pulses were counted with a Philips PM6645C frequency meter using a 10 second gate time. The photomultiplier was placed vertically within a light-tight box in which all experiments were conducted. The background was approximately 10 counts per second using this apparatus.

A 30 ml beaker was placed on the silica face of the photomultiplier tube. A scintillator with a 0.4 μm thick sulfonated ionic layer was placed in the beaker with the sulfonated layer facing away from the photomultiplier tube. Unlabelled calcium (10 ml, $10^{-3}$ M) was added to the beaker. A small aliquot (40 μCi) of labelled calcium was added as the solution was stirred. The scintillation counts were observed to rise from background to 6000 counts per second within minutes as calcium was absorbed by the sulfonate anions on the solid scintillator surface.

The experiment was repeated using a solid scintillator that was not surface sulfonated. The scintillation counts observed for the untreated solid scintillator rose to only 600 counts per second, indicating that the sulfonate layer improved the detection limit by a factor of ten.

The experiment was repeated using $10^{-5}$ M Ca instead of $10^{-3}$ M Ca. The count rate for the sulfonated and untreated scintillators was 600,000 cps and 600 cps, respectively. The detection limit was improved by a factor of 1000 when the solid scintillator was sulfonated.

The inherent maximum counting efficiency of the process is 50% because half of the B particles are emitted in a direction opposite to the scintillator. The overall counting efficiency during these experiments was estimated at 35%.

While the invention is susceptible to various modifications and alternative forms, specific embodiments thereof have been shown by way of example and were herein described in detail. It should be understood, however, that it is not intended to limit the invention to the particular form disclosed, but on the contrary, the intention is to cover all modifications, equivalents and alternatives falling within the spirit and scope of the invention as defined by the appended claims.

I claim:

1. A light source for calibration of imaging devices, the light source comprising a solid scintillator; an ionic layer on a surface of and in contact with the solid scintillator, the ionic layer including anions or cations; radioactive ions bound to the anions or the cations of the ionic layer, forming a radioactive surface; and an absorbent layer which covers the radioactive surface and absorbs radiation emitted from the radioactive ions such that radiation is contained within the light source.

2. The light source of claim 1 wherein the ionic layer is an ion exchanging material.

3. The light source of claim 2 wherein the ion exchanging material is an ion exchange resin or zeolite.

4. The light source of claim 1 wherein the ionic layer consists of sulfonate anions, carboxylate anions, secondary amine cations, tertiary amine cations, or quaternary ammonium cations.

5. The light source of claim 1 wherein the solid scintillator includes an optically clear solid.

6. The light source of claim 5 wherein the optically clear solid is a plastic.

7. The light source of claim 6 wherein the plastic includes polystyrene.

8. The light source of claim 1 wherein the solid scintillator includes a compound containing an element having an atomic number of at least 35.

9. The light source of claim 1 wherein the solid scintillator includes a compound containing an element having an atomic number of 50 to 83.

10. The light source of claim 1 wherein the absorbent layer is a coating, epoxy, sealant, metal foil or a second solid scintillator.

11. A receptacle for absorbing and concentrating radioactive ions within a solution, the receptacle comprising:

a solid scintillator containing an optically clear solid and a fluor;

a receptacle having a wall comprising the solid scintillator; and an ionic layer on a surface of and in contact with the solid scintillator, wherein the ionic layer is in contact with the solution when the solution is contained within the receptacle, the ionic layer being insoluble in the solution and comprising cationic or anionic groups, the cationic or anionic groups being capable of binding radioactive ions and extracting the ions from the solution, positioning the ions in close proximity to the solid scintillator such that energy emitted by radiation from the ions excites the fluor, causing the fluor to emit light which passes through the wall of the receptacle and is detectable by a radiation detector.

12. The receptacle of claim 11 wherein the ionic layer is an ion exchanging material selected from the group consisting of ion exchange resins and zeolites.

13. The receptacle of claim 11 wherein the ionic layer consists of sulfonate anions, carboxylate anions, secondary amine cations, tertiary amine cations, or quaternary ammonium cations.

14. The receptacle of claim 11 wherein the wall is a bottom wall of the receptacle.

15. The receptacle of claim 11 wherein the surface is generally planar.

16. The receptacle of claim 11 wherein the solid scintillator includes a compound containing an element having an atomic number of at least 35 to enable the solid scintillator to absorb electromagnetic radiation.

17. The receptacle of claim 16 wherein the solid scintillator includes a compound containing an element having an atomic number of 50 to 83.

18. A method of detecting radiation comprising:

positioning a radiation detector adjacent to a wall of a receptacle, the wall comprising a solid scintillator and an ionic layer on a surface of and in contact with the solid scintillator, the solid scintillator having an optically clear solid and a fluor;

transferring a solution containing radioactive ions into the receptacle such that the ionic layer is in contact with the solution;

extracting the ions from the solution and binding them to the ionic layer such that radiation emitted by the ions adjacent the solid scintillator excites the fluor and causes the fluor to emit light; and detecting the light emitted by the fluor through the wall of the receptacle.

19. The method of claim 18 wherein the radioactive ions emit $\alpha$ particles or $\beta$ particles.

20. The method of claim 18 wherein the radioactive ions emit electromagnetic radiation which is absorbed by the solid scintillator.

21. A method of making a solid scintillating composition for absorbing and concentrating particulate radiation within a solution, the method comprising the steps of:

providing a solid scintillator containing a fluor and an optically clear solid;

modifying a surface of the scintillator to form a plurality of ionic groups on the surface; and rinsing the modified surface with an organic solvent.

22. The method of claim 21 wherein the surface is modified by depositing an ion exchanging material on the surface or by reacting the plastic with a reagent to form the ionic groups.

23. A radiation detection system for absorbing and concentrating radioactive ions within a solution, the system comprising:

a solid scintillator containing an optically clear plastic and a fluor;

a receptacle capable of holding the solution, the receptacle having a bottom wall comprising the solid scintillator;

an ion exchanging material on a surface of and in contact with the solid scintillator, wherein the ion exchanging material is in contact with the solution when the solution is contained within the receptacle, the ion exchanging material being insoluble in the solution and comprising cationic or anionic groups, the cationic or anionic groups being capable of binding radioactive ions and extracting the ions from the solution, positioning the ions in close proximity to the solid scintillator such that energy emitted by radiation from the ions excites the fluor, causing the fluor to emit light; and a radiation detector for detecting the light emitted by the fluor that passes through the wall of the receptacle.

24. The receptacle of claim 23 wherein the plastic includes polystyrene.

25. The receptacle of claim 23 wherein the ion exchanging material is an ion exchange resin or a zeolite.

26. The receptacle of claim 23 wherein the ion exchanging material consists of sulfonate anions, carboxylate anions, secondary amine cations, tertiary amine cations, or quaternary ammonium cations.

27. The receptacle of claim 23 wherein the solid scintillator includes a compound containing an element having an atomic number of 35 to 83 to enable the solid scintillator to absorb electromagnetic radiation.

* * * * *